United States Patent [19]
Davidson

[11] Patent Number: 5,215,167
[45] Date of Patent: Jun. 1, 1993

[54] ADJUSTABLE BICYCLE BRAKE CABLE CONTROL FOR CANTILEVERED BRAKE SYSTEM

[75] Inventor: Rodney R. Davidson, Lomita, Calif.
[73] Assignee: Bear Corporation, Carson, Calif.
[21] Appl. No.: 759,527
[22] Filed: Sep. 13, 1991
[51] Int. Cl.⁵ .............................................. B62L 1/14
[52] U.S. Cl. .................... 188/24.19; 188/24.21; 188/196 M; 403/43; 403/60; 403/77; 403/118
[58] Field of Search ............ 188/24.11, 24.12, 24.29, 188/24.21, 196 M, 202; 403/43, 44, 45, 60, 77, 118

[56] References Cited

U.S. PATENT DOCUMENTS

| | | | |
|---|---|---|---|
| 2,785,835 | 3/1957 | Tsrumfield | 403/118 X |
| 4,051,924 | 10/1977 | Yoshigai | 188/24.12 |
| 4,560,147 | 12/1985 | Bowdren | 403/43 X |

FOREIGN PATENT DOCUMENTS

| | | | |
|---|---|---|---|
| 456893 | 9/1913 | France | 188/24.21 |
| 556919 | 7/1923 | France | 188/24.12 |
| 17221 | of 1902 | United Kingdom | 188/24.11 |

Primary Examiner—George E. A. Halvosa
Attorney, Agent, or Firm—Charles H. Thomas

[57] ABSTRACT

A brake adjustment mechanism is provided for a bicycle wheel to allow cantilevered bicycle brakes to be adjusted quickly and easily and without the application of the brakes to the bicycle wheel. The brake adjustment mechanism employs a cable yoke which has a body adapted for connection to the flexible brake cable of a conventional cantilevered bicycle brake. The yoke has a pair of projecting supports that extend outwardly from opposite sides of a yoke body and toward opposite sides of the bicycle wheel. A separate socket is carried by each of the projecting supports. The sockets are movable in rotation relative to the yoke and each socket has a tapped opening facing a separate one of the bicycle brake lever arms. A pair of elongated rigid rods are each secured at one end to separate ones of the bicycle brake lever arms. Both of the elongated rods have externally threaded ends which are threadably engaged in separate ones of the tapped openings of the sockets. Rotation of the sockets relative to the threaded rods varies the overall effective length of the rigid structures formed by the sockets and the rods, thereby varying the initial dispositions of the brake lever arms and the initial positions of the brake pads to be adjusted in the absence of a braking force.

11 Claims, 3 Drawing Sheets

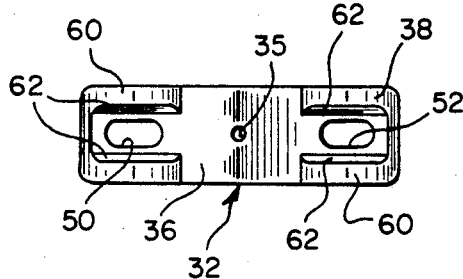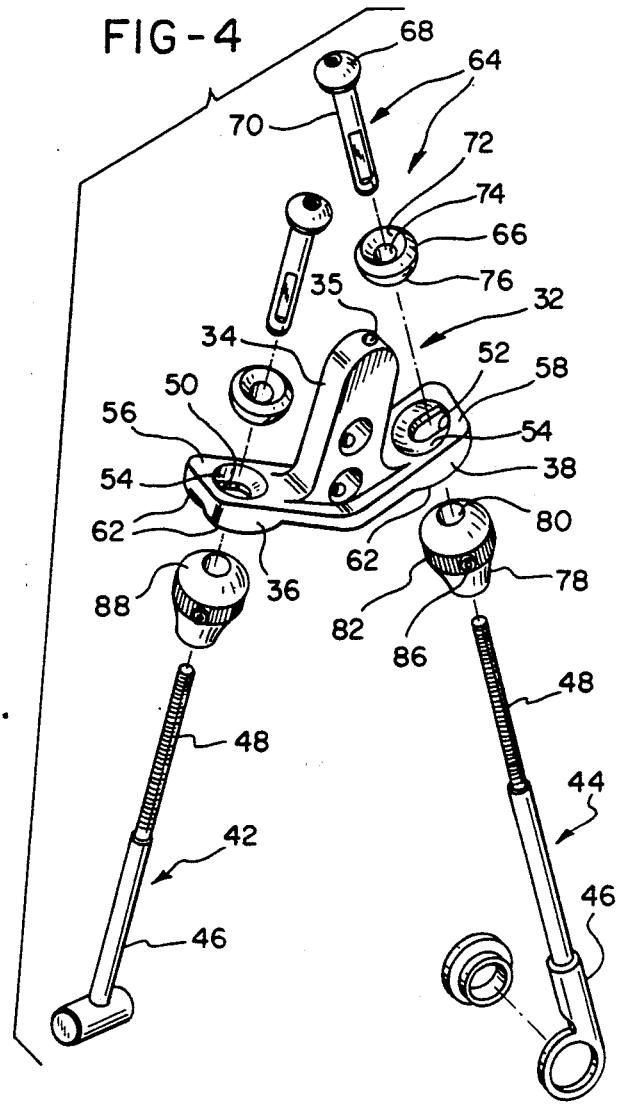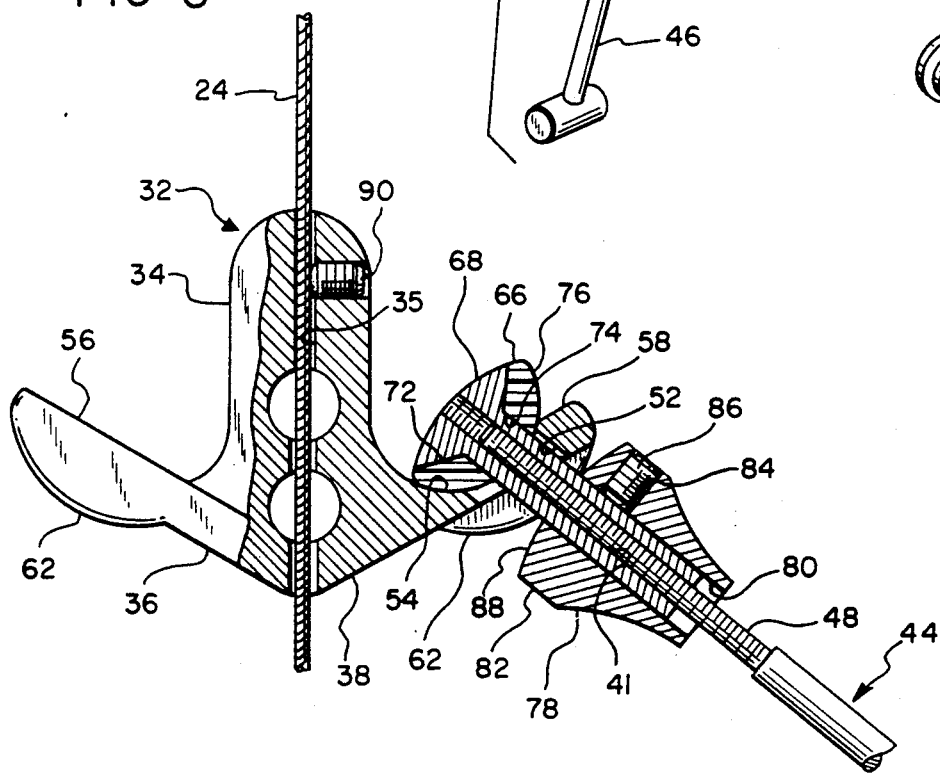

ADJUSTABLE BICYCLE BRAKE CABLE CONTROL FOR CANTILEVERED BRAKE SYSTEM

BACKGROUND OF THE INVENTION

1. Field of the Invention

The present invention relates to a bicycle brake cable control for a cantilevered bicycle brake system in which the positions of the brake pads are adjustable independently of each other.

2. Description of the Prior Art

Most modern bicycles have for some time employed hand operated cantilevered brake systems. In such brake systems the brake controls include hand operated brake actuating levers mounted on the handlebars of a bicycle. Each brake actuating lever is coupled to a central stainless steel multiple strand cable core which may be moved longitudinally in reciprocal fashion within a surrounding cable sleeve. The bicycle hand brake actuating lever is secured to the cable core while one end of the flexible cable sleeve is attached to the hand brake actuating lever mounting. Operation of the bicycle hand brake actuating lever exerts tension on the cable core and draws the cable core longitudinally toward the hand brake actuating lever within the confines of the surrounding cable sleeve.

At the opposite end of the flexible bicycle brake cable a pair of generally U-shaped brake lever arms are typically mounted for rotation about a common axis on the bicycle frame. The brake lever arms are normally secured to the bicycle frame at a fork or a rear seat stay mount on the frame. Frame members extend from the mounting on both sides of a bicycle wheel which rotates within the wheel mounting. The brake lever arms overlap each other and carry brake pads in cantilevered fashion on opposite sides of the bicycle wheel. The flexible, bicycle cable sleeve is secured to one of the brake lever arms for each brake, while the cable core is secured to the other brake lever arm.

The brake lever arms are normally spring biased so that the brake pads are held laterally away from the wheel rim which rotates therebetween. However, when the hand brake actuating lever is operated to pull the brake cable core longitudinally within the cable sleeve, both of the brake lever arms are rotated in mutually opposite directions of rotation about the axis of mounting to the bicycle frame to overcome the spring bias. This moves the brake pads laterally into frictional engagement with the rim of the bicycle wheel located therebetween. The force of friction thereby quickly reduces the speed of rotation of the bicycle wheel within the mounting.

Ideally the brake pads are carried by the bicycle brake lever arms equidistant from the opposite sides of the bicycle wheel rim. Thus, when force is transmitted longitudinally along the flexible bicycle brake cable the brake pads are moved laterally toward the rotating wheel an equal distance and thereupon apply lateral force equally from the opposite sides of the wheel rim. This maximizes braking efficiency. Since the apposing lateral forces are equal and opposite, there is no force component that tends to misalign the bicycle wheel.

Fairly frequently, however, the spacing of the bicycle brake pads from the wheel rim becomes unequal. This may result from many different causes, including bending of the bicycle frame, uneven wear on the engaging faces of the bicycle brake pads, twisting of the lever arms on their axis of rotation relative to the bicycle frame, unequal tension on the bicycle wheel spokes, and other reasons as well.

When the bicycle pads are spaced unequally from the sides of the bicycle wheel, they will apply unequal forces as the bicycle brakes are applied. This detracts markedly from braking efficiency, since the frictional force applied in one lateral direction is greater than that applied in the opposite direction. This increases the minimum distance within which a bicycle can be brought to a stop and also the braking effort which must be applied by the bicycle rider. Furthermore, this condition results in unequal wear on the brake pads and can force the bicycle wheel into a condition of misalignment.

To correct the unequal application of forces by bicycle pads in a cantilevered bicycle brake system, it has heretofore been necessary to concurrently force both of the bicycle brake pads into contact with the bicycle wheel, loosen the nut which secures the brake lever arms to the mounting stud on the bicycle frame, and retighten the nut on the mounting stud to attempt to adjust the positions of the brake lever arms relative to each other so as to equalize the distance from the wheel at which the brake pads reside when the brakes are released.

One problem with the conventional technique for adjusting bicycle brake pads is that the adjustment can be performed only while the brake pads ar concurrently held in contact with the bicycle wheel, as they are during braking. At the same time, however, the bicycle owner must effectuate the necessary loosening and retightening of the brake lever arm mounting system. The concurrent performance of all these tasks is extremely difficult to perform by a user with only two hands, and assistance is often required. Also, it is oftentimes very difficult to secure the brake lever arms in position relative to the wheel so that the brake pads are held at equal distances therefrom when the brake is released. The adjustment of a conventional bicycle brake system is very time consuming and can only be performed with tedious and repeated trial and error adjustment.

SUMMARY OF THE INVENTION

The present invention relates to an improved system for bicycle brake cable control for a cantilevered bicycle brake system. The bicycle brake adjustment mechanism of the present invention allows a user to independently adjust the positions of the bicycle brake pads relative to the bicycle wheel. Furthermore, this independent adjustment can be performed while the bicycle brake is released, rather than requiring the bicycle brake pads to be in contact with the bicycle wheel as in the adjustment of conventional brake cable control systems. Thus, the person making the adjustment is not forced to hold the bicycle brake pads applied in frictional engaging contact against the wheel while performing the necessary adjustment.

A further advantage of the invention is that the positions of the bicycle brake pads relative to a wheel are not interdependent. Conventional systems require the relative positions of the bicycle brake lever arms to be adjusted together by loosening and retightening a lever arm fastening nut on a lever arm mounting stud. That is, in conventional bicycle brake cable control systems the brake lever arms are rotated together in a single direction so as to increase the distance between one pad and the bicycle wheel while simultaneously reducing the distance between the other brake pad and the bicycle wheel. As a result the extent of relative adjustment of the pads is always multiplied by a factor of two, since the pad positions cannot be adjusted independently of each other.

According to the present invention a bicycle brake cable control for cantilevered brake system is provided with means for adjusting the position of each brake pad without concurrently affecting the position of the other brake pad relative to the wheel. Furthermore, the adjusting mechanism is such that very fine adjustments can be made to each bicycle brake pad.

A further advantage of the present invention is that since the adjustments to the positions of the bicycle brake pads are performed without the application of the brakes, the person performing the adjustment can make a clear visual comparison of the position of a pad being adjusted relative to the opposite, stationary pad, since neither pad is in contact with the bicycle wheel during the adjustment process.

In one broad aspect the present invention may be considered to be a bicycle brake comprising several elements. The bicycle brake of the invention is comprised of a brake actuating mechanism located remote from a bicycle wheel, and a pair of brake lever arms each independently and rotatably mounted on a bicycle frame on opposite sides of the bicycle wheel. A separate brake pad is mounted on each of the brake lever arms. The brake pads ar laterally movable into frictional engagement with the bicycle wheel. Spring biasing means act between the bicycle frame and the lever arms to urge the brake pads laterally away from the bicycle wheel, as in conventional cantilevered brake systems. Also, a flexible brake cable is coupled from the brake actuating mechanism to the bicycle brake mechanism to overcome the spring biasing means so as to urge the brake pads into frictional engagement with the bicycle wheel when placed in tension by the brake actuating mechanism.

Unlike conventional systems, however, the bicycle brake of the present invention includes a brake adjustment mechanism that is interposed between the flexible cable and the brake lever arms. This brake adjustment mechanism includes a cable yoke having a body to which the flexible cable is anchored and a pair of supports projecting laterally from opposite sides of the body. The brake adjustment mechanism also includes a pair of elongated rigid members which are each separately and selectively variable in length and which each have a first end coupled to a separate one of the projecting supports so as to permit lateral movement and prohibit longitudinal movement therebetween. The rigid members also each have a second end connected to a separate one of the brake lever arms.

Preferably each of the rigid members is comprised of a socket mounted for rotation in a separate one of the laterally projecting supports and a rigid rod having a remote end secured to a separate one of the brake lever arms and a proximate end that is externally threaded and threadably engaged with the socket. The rigid rod of each of the elongated rigid members is preferably constructed of stainless steel. The rod thereby has an enhanced strength and considerable resistance to corrosion. The sockets are rotatable relative to both the laterally projecting supports and also the rigid rods. The sockets can be rotated independently of each other relative to the threaded ends of the rods with which they are engaged. Rotation of the sockets relative to the threaded ends of the rods thereby varies the extent to which the threaded rod ends are longitudinally advanced into the sockets or longitudinally withdrawn therefrom. Moreover, advancement or retraction to increase or reduce the extent of the threaded engagement is performed independently as between each socket and the rod engaged therewith. The extent of engagement and disengagement determines the overall length of each elongated rigid member, which in turn directly controls the position of the brake pad associated therewith relative to the wheel.

Each of the laterally projecting supports of the cable yoke is preferable provided with a laterally elongated opening therethrough. Each socket of each of the elongated rigid members is preferably comprised of a swivel with a neck residing within one of the laterally elongated openings. Thus, the swivels can be moved in translation, independently of each other, toward and away from the cable yoke body. Also, the swivels are preferably constructed so that they can be moved in rotation in the plane of the yoke through a limited arc relative to the laterally projecting supports in which they are mounted.

Each swivel may be constructed with a retaining barrel that is releasably coupled to the swivel neck. The swivel neck is internally and axially tapped to receive the threaded end of the rigid rod as aforesaid. A tapped radial bore may be defined in each of the retaining barrels and a set screw may be threadably engaged in the tapped radial bore. Thus, the retaining barrel can be secured to the swivel neck by means of the set screw. Since the outer diameter of the swivel neck is greater than the diameter of the elongated rod which is threadably engaged therewithin, the set screw bears against a relatively broad bearing surface. This enhances the extent to which the socket barrel is immobilized relative to the socket swivel.

The exterior surface of the barrel may be knurled. The knurled outer barrel surface, coupled with its relatively large diameter, as contrasted with the diameter of the elongated threaded rod, allows the barrel to be utilized as a thumbwheel for turning the socket relative to the rod. Very fine adjustments in the overall effective length of the rigid member formed by the socket and the rod are therefore possible. The use of the barrel as a thumbwheel allows fine tuning of the degree of threaded engagement of the rod within the socket. By providing the socket with a thumbwheel it is possible to fine tune the adjustment of the brake mechanism. The finer the pitch of the axial thread in the socket and on the externally threaded rod engaged therewith, the finer will be the degree of adjustment of the longitudinal length of the rigid member.

The head of the swivel bears against the surfaces of the projecting supports that face away from the brake levers and the retaining barrels bear against the surfaces of the projecting supports that face the brake levers. The elongated rod is thereby prevented from moving longitudinally relative to the cable yoke, except by adjusting the extent of the engagement of the rod in the socket. The projecting supports are preferably provided with concave recesses on the sides thereof opposite the bicycle brake lever arms, and the undersides of the heads of the swivels are convex downwardly so that the heads of the swivels can rock in a lateral direction relative to the body of the cable yoke. Also, the sides of the projecting supports facing the brake lever arms are preferably provided with longitudinal ridges on either side of the elongated openings through which the swivel necks extend. The surfaces of the retaining barrels that ride in contact with these ridges are preferably convex also. Thus, the surfaces of the retaining barrels facing the projecting supports can ride longitudinally on the downwardly projecting ridges with a minimum of friction so that the sockets can move both in rotation and in lateral translation relative to the projecting supports in which they are mounted. With the radially disposed set screw in the retaining barrel advanced to bear radially against the outer surface of the internally threaded tube of the swivel the sockets cannot move in longitudinal translation relative to the projecting supports.

Preferably a mechanism is provided for adjusting the positions of the brake pads together, as well as independently of each other. The bicycle brake of the invention includes some releasable cable locking means for adjusting the longitudinal position of the flexible cable relative to the yoke body. This allows for the concurrent adjustment of both brake pads either toward or away from the wheel, if desired In one embodiment of the invention the means for releasably securing the cable yoke at a selected location along the flexible cable is a set screw that is threadably engaged in a tapped opening that is directed radially toward the cable passing therethrough. The cable core strands are thereby clamped between the bearing end of the set screw and the wall of an internal passageway within the yoke through which the cable core extends. Alternatively, the cable core may be clamped within the yoke by means of a bolt having a transverse opening through its shank through which the cable extends. A nut secured to the externally threaded shank of the bolt bears against the wall of the yoke adjacent thereto. Tightening of the nut causes the cable core to be clamped within the yoke by means of compressive force exerted between the wall of the transverse opening in the bolt shank and the interior wall of the brake cable passageway within the yoke. In another aspect the invention may be considered to be a bicycle brake adjustment device for use in a bicycle brake system in which tension on a flexible cable is employed to operate bicycle brake lever arms that are rotatably mounted on a bicycle frame. The bicycle brake lever arms are operated to bring the brake pads into frictional engagement with a bicycle wheel. The adjustment device is comprised of a cable coupling having a body secured to the flexible cable and a pair of supports projecting laterally from opposite sides of the body. Separate internally tapped sockets are provided and are carried by each of the projecting supports. The sockets are mounted so as to be laterally movable relative to the supports. Separate rigid connecting rods extend from each of the bicycle lever arms to separate ones of the sockets. Each of the rods has an externally threaded end threadably engaged in a separate one of the sockets.

The invention may be described with greater clarity and particularity with reference to the accompanying drawings.

DESCRIPTION OF THE DRAWINGS

FIG. 4 is an exploded view showing a portion of the brake adjustment mechanism of FIGS. 1-3.

FIG. 5 is a bottom plan view of the cable yoke of FIG. 4 shown in isolation.

FIG. 6 is an elevational detail, shown partially in section, of portions of the brake adjustment mechanism of FIG. 4 assembled together.

DESCRIPTION OF THE EMBODIMENT

Figure 1:
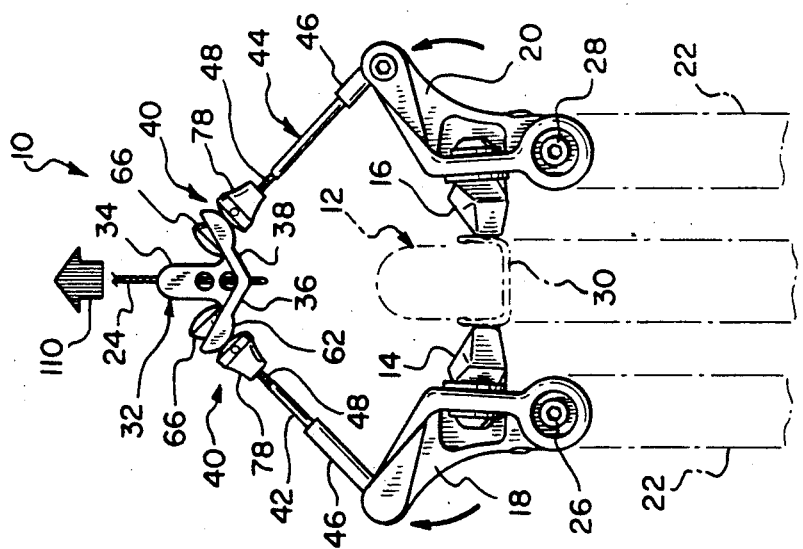
FIG. 1 is a front elevational view illustrating the brake adjustment mechanism of the invention in need of adjustment.

FIG. 1 illustrates a brake adjustment mechanism for a brake for a bicycle wheel. The brake adjustment mechanism is indicated generally at 10 and the bicycle wheel is indicated in phantom at 12. The bicycle brake employs a pair of brake pads 14 and 16 which are respectively mounted on lever arms 18 and 20. The lever arms 18 and 20 are coupled to the cantilevered brake bosses on a bicycle frame or front fork, portions of which are indicated generally in phantom at 22. The lever arms 18 and 20 are respectively mounted for rotation relative to the bicycle frame 22 by means of axes 26 and 28.

Figure 3:
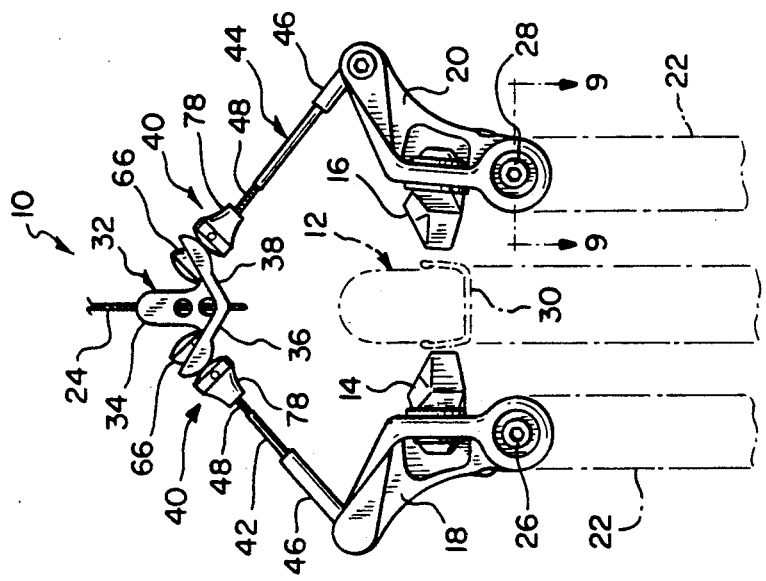
FIG. 3 illustrates the brake adjustment mechanism of FIG. 2 showing the application of braking force to a bicycle wheel.
Figure 9:
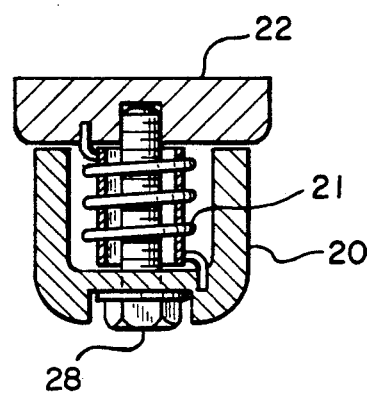
FIG. 9 is a sectional detail taken along the lines 9—9 of FIG. 1.

The lever arms 18 and 20 are provided with conventional spring biasing means 21, visible in FIG. 9, to bias the brake pads 14 and 16 away from the wheel rim 30. The lever arms 18 and 20 are mounted such that when the brake actuating mechanism is triggered by the application of tension on a flexible stainless steel cable 24, the lever arms 18 and 20 are rotated respectively about axes 26 and 28 to bring the brake pads 14 and 16 into contact with the rim 30 of the wheel 12 to laterally apply force against the wheel 12 from opposite directions. FIG. 3 illustrates the actuation of the bicycle brake. During brake actuation upward tensile force is exerted on the flexible cable 24, typically by means of a bicycle hand brake actuating lever mounted on the bicycle handlebars (not shown).

Figure 2:
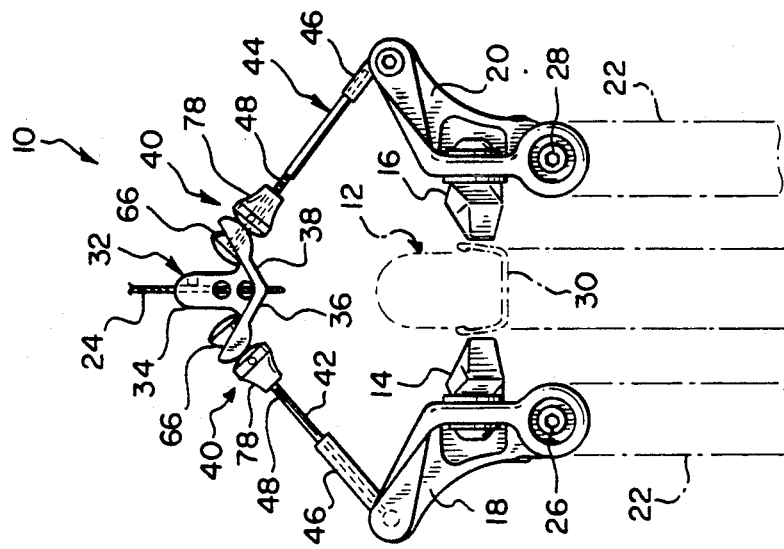
FIG. 2 illustrates the brake adjustment mechanism of FIG. 1 after it has been properly adjusted.

The brake adjustment mechanism 10 of the invention is comprised of a cable coupling yoke 32 having a body 34 adapted for connection to the flexible cable 24 for movement in reciprocation therewith, as best illustrated in FIGS. 2 and 3. The cable yoke body 34 has an axial opening 35 that extends therethrough from top to bottom. The cable yoke 32 also has a pair of laterally projecting supports 36 and 38 which extend from opposite sides of the body 34 toward opposite sides of the bicycle wheel 12. A separate socket 40 is carried by each of the projecting supports 36 and 38. Each of the sockets 40 is movable in rotation relative to the projecting support 36 or 38 upon which it is mounted.

Each socket 40 has a tapped opening 41 (FIG. 6) facing a separate one of the lever arms 18 and 20. A pair of elongated rigid rods 42 and 44 are each secured at one end 46 by a hinge connection to a separate one of the lever arms 18 and 20. Both of the elongated rigid rods 42 and 44 have opposite, externally threaded ends 48 that are threadably engaged in separate ones of the tapped openings of the sockets 40.

As best illustrated in FIGS. 4, 5 and 6 the laterally projecting supports 36 and 38 are each constructed with elongated openings 50 and 52 therein, respectively, that extend laterally away from the upright cable yoke body 34 on opposite sides thereof. The openings 50 and 52 are laterally elongated in the direction of projection of the projecting supports 36 and 38.

Concave recesses 54 are defined in the upper surfaces 56 and 58 of the laterally projecting supports 36 and 38 surrounding the elongated openings 50 and 52. The surfaces 56 and 58 face upwardly, away from the elongated rigid members formed by the elongated rods 42 and 44 and the sockets 40. The opposite surfaces 60 of the laterally projecting supports 36 and 38 face the brake lever arms 18 and 20. A pair of parallel, laterally extending ridges 62 are formed on the surfaces 60 of both of the laterally projecting supports 36 and 38. The ridges 62 reside on opposite sides of the body 34 and in alignment with elongated openings 50 and 52. As illustrated in FIGS. 1-3 and 6 the ridges 62 are arcuately curved convex toward the brake lever arms 18 and 20.

FIGS. 4 and 6 illustrate the structure of the sockets 40 in detail. Each of the sockets 40 is identical in structure and has a swivel including a stainless steel swivel pin 64, a plastic head 66 and a stainless steel retaining barrel 78. The swivel pin 64 has an enlarged knob 68 at its upper extremity and a shank extending therefrom in the form of a hollow tube 70. The tube 70 is internally threaded to define a tapped opening 41. The underside of the knob 68 is rounded convex downwardly and seats within a corresponding upwardly facing convex recess 72 in the top of the swivel head 66. The internally threaded tube 70 of the swivel pin 64 extends through an axial passageway 74 in the head 66. The undersurface 76 of the swivel head 66 is rounded convex downwardly so as to seat in the concave upwardly facing recess 54 in either laterally projecting support 36 or 38.

Where the internally threaded tubes 70 of the swivels pass through the openings 50 and 52 in the laterally projecting supports 36 and 38, they form swivel necks. Each of the annular retaining barrels 78 has a knurled outer surface 82 which is of a relatively large diameter, and an inner axial passage 80 therethrough. The swivel neck formed by the internally threaded tube 70 extends into the axial passage 80. The diameter of the knurled outer surface 82 is relatively large compared to the diameter of the threaded, elongated rods 42 and 44.

Each retaining barrel 78 also has a internally tapped, radial opening 84 therein extending from the knurled outer surface 82 to the inner passageway 80. As best illustrated in FIG. 6, an externally threaded allen head set screw 86 is threadably engaged in the tapped radial opening 84, and can be advanced toward or withdrawn away from the passage 80.

To properly install the sockets 40 on the projecting supports 36 and 38, the swivel pin 64, swivel head 66 and barrel 70 are assembled together as depicted in FIG. 6 with the set screw 86 loosened to allow longitudinal movement of the internally threaded tube 70 through the passage 80. Once the downwardly facing convex surface 76 of the swivel head 66 is seated in a recess 54, the upwardly facing convex surface 88 of the barrel 78 is brought into abutment against the downwardly facing convex ridges 62. The set screw 86 is then tightened so that its radially inwardly directed bearing face is clamped against the outer wall of the internally threaded tube 70 of the swivel pin 64. The annular retaining barrel 78 is thereby disposed externally about the swivel tube 70 and is secured thereto by the set screw 86.

With the barrel 78 secured to the swivel pin 64 in this manner, the assembled socket 40 is laterally movable relative to the cable coupling yoke 32 within the limits of the elongated openings 50 and 52. The elongated openings 50 and 52 permit both lateral movement and rotational movement of the sockets 40 therewithin. That is, the internally threaded tubes 70 of the swivel pins 64 can move laterally in translation both toward and away from the yoke body 32. Furthermore, the swivel heads 66, with the swivel pins 64 therewithin, can rock in rotation within the recesses 54, within the limits allowed by the lengths of the elongated openings 50 and 52. The convex upwardly facing rounded surface 88 of the barrel 78 rides upon the downwardly facing ridges 62 on the undersides 60 of the laterally projecting supports 36 and 38.

The cable yoke 32 preferably includes a means for securement at a selected location along the flexible cable 24. As illustrated in FIG. 6, the cable yoke 32 may be secured relative to the cable 24 by means of an internally tapped opening in the side of the cable yoke body 34. This opening receives a cable clamping set screw 90 which is directed radially toward the cable 24. When the set screw 90 is advanced radially inwardly in threaded engagement within the yoke body 34, it bears radially against the cable 24 to clamp the cable 24 against the opposite wall of an axial passageway 35 that extends through the length of a cable yoke body 34. If desired, concurrent adjustment of both brake pads 14 and 16 may be accomplished by adjusting the longitudinal position of the cable yoke 32 relative to the cable 24. This is done by loosening the cable clamping set screw 90, advancing or withdrawing the cable 24 relative to the yoke body 34, and retightening the cable clamping set screw 90.

Figure 7:
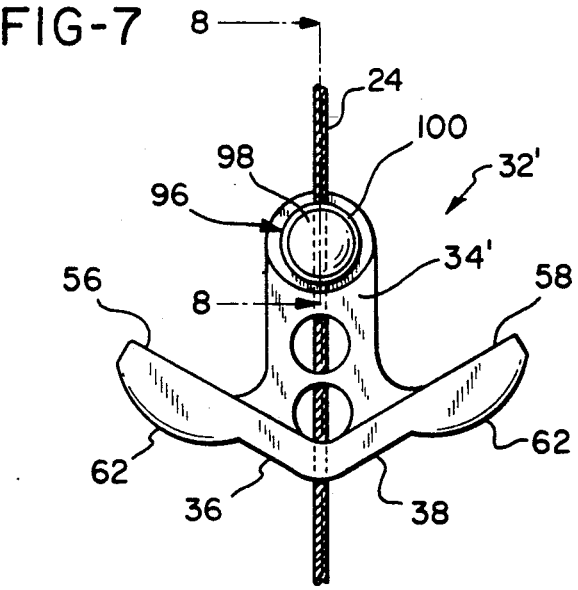
FIG. 7 is an elevated view of an alternative embodiment of a cable yoke employed according to the invention.
Figure 8:
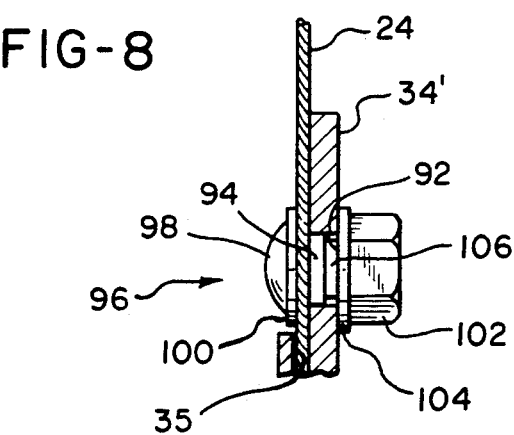
FIG. 8 is a sectional elevational detail taken along the lines of 8—8 of FIG. 7.

FIG. 7 illustrates an alternative cable yoke 32'. Like the cable yoke 32, the cable yoke 32' has an axial opening 35 that extends throughout the length of the yoke body 34'. Instead of the set screw 90, however, the yoke body 34' has a generally rectangular, transverse opening 92 defined through its upper portion. The rectangular opening 92 is adapted to receive the rectangular portion 94 of the shank of a bolt 96 that extends transversely through the structure of the yoke body 34'. A narrow, transverse cable passageway is defined through the rectangular portion 94 of the shank of the bolt 96 so as to receive the cable 24 therethrough. The head 98 of the bolt 96 bears against a washer 100 on one side of the yoke body 34', while a nut 102 and washer 104 bear against the opposite side of the yoke body 34'. The portion 106 of the shank of the bolt 96 is cylindrical with external threads defined thereon so that the nut 102 can be screwed onto this threaded portion of the bolt shank.

The nut 102 can be loosened from the threaded portion 106 of the bolt shank to allow longitudinal adjustment of the cable 24 relative to the yoke body 34'. When the yoke 32' is correctly positioned along the length of the cable 24, the nut 102 is tightened, thereby causing the rectangular portion 94 of the shank of the bolt 96 to clamp the cable passing through the transverse opening therethrough against the wall of the axial passageway 35 within the yoke body 34'. The yoke 32' is thereby immobilized relative to the cable 24, although in a releasable manner.

FIG. 1 illustrates a bicycle brake which requires adjustment. As illustrated in FIG. 1, the brake pad 16 is significantly more distant from the rm 30 of the bicycle wheel 12 than is the brake pad 14. Consequently, if the bicycle brake were applied without adjusting the brake adjustment mechanism 10 depicted in FIG. 1, actuation of the hand brake lever would cause the brake pad 14 to contact the rim 30 of the wheel 12 with a much greater force than would be applied by the brake pad 16. The rider would thus be required to apply greater braking power to stop, since the application of braking force by the brake pads 14 and 16 would be unequal and inefficient.

With the brake adjustment mechanism 10 according to the invention the bicycle brake can easily be adjusted. To perform the adjustment the user merely rotates the retainer barrel 78 on the socket 40 that is captured by the projecting support 38 in a direction so as to advance the threaded end 48 of the elongated rod 44 further into the internally threaded tube 70. As long as the set screw 86 in the barrel 78 is tightened against the outer surface of the internally threaded tube 70, rotation of the retainer barrel 78 will also carry the pivot pin 64 in rotation therewith. The knurled fingergrips on the barrel surface 82 and the relatively large diameter of the barrel 78 at the surface 82 allow the socket 40 to be rotated relative to the elongated rod 44 with a very close degree of fine tuning.

FIG. 2 illustrates the brake adjustment mechanism 10 of FIG. 1 after it has been properly adjusted. It should be noted that adjustment is performed without application of the brakes. Consequently, a rider can visually observe the relative distances between the brake pad 14 and the wheel rim 30 and the brake pad 16 and the wheel rim 30 as the adjustment is performed. Also, the ability to adjust the positions of the brake pads 14 and 16 without pressing the brake pads 14 and 16 against the wheel rim 30 greatly facilitates the adjustment process, since the hands of the person performing the adjustment are freed of the task of applying the brake during the adjustment process.

Once the brake adjusting mechanism 10 has been brought into proper adjustment, as depicted in FIG. 2, the brakes will be applied evenly upon operation of the conventional brake actuating lever. As illustrated in FIG. 3, when the brakes are to be applied, tension is exerted on the brake cable 24 in the direction of the directional arrow 110. This force is transmitted through the cable yoke 32 and an upward force is exerted on the sockets 40. Since the sockets 40 are rotatable relative to the cable yoke 32 in a lateral plane, the brake adjusting mechanism 10 is able to accommodate the change in angle of alignment of the elongated rods 42 and 44 relative to the projecting supports 36 and 38. That is, the swivel heads 66 are rocked in counterrotation relative to each other in the respective recesses 54 in the projecting supports 36 and 38. This causes force to be transmitted through the elongated rods 42 and 44 from the cable yoke 32 so as to rotate the brake lever arm 18 in a clockwise direction about its axis of rotation 26, as viewed in FIG. 3, while the brake lever arm 20 is rotated in a counterclockwise direction about its axis of rotation 28.

Once the brake adjusting mechanism 10 has been properly adjusted as depicted in FIG. 2, the brake pads 14 and 16 are brought to bear evenly and with equal force on the opposite sides of the wheel rim 30. The bicycle is thereby brought smoothly to a stop with an even application of force on both sides of the wheel 12.

From FIGS. 1-3 and 6 it is apparent that the spacing of the brake pads 14 and 16 from the wheel rim 30 can be adjusted in either direction and independently of each other by rotating or counterrotating either of the sockets 40 mounted on the projecting supports 36 and 38. The elongated rods 42 and 44 are prevented from rotating due to their hinged connections to the lever arms 18 and 20. The adjustment of the bicycle brake can be performed far more swiftly and easily and with far greater accuracy than is possible with conventional bicycle brake adjusting devices.

Undoubtedly, numerous variations and modifications of the invention will become readily apparent to those familiar with bicycle maintenance. For example, if desired a releasable locking mechanism could be employed to prevent relative rotation between the swivels 40 and the elongated rods 42 and 44, if desired. Such a locking mechanism could take the form of a locking nut threadably engaged on both of the threaded ends 48 of the elongated rods 42 and 44 beneath the sockets 40. When adjustment is desired the locking nuts could be rotated and backed off from the sockets 40 to allow the necessary adjustment to be performed. Once adjustment is completed the locking nuts could be advanced to bear against the sockets 40, thereby preventing relative rotation between the sockets 40 and the elongated rods 42 and 44. This is normally not necessary, however.

I claim:

1. A bicycle brake comprising:
   a brake actuating mechanism located remote from a bicycle wheel,
   a pair of brake lever arms each independently rotatably mounted on a bicycle frame on opposite sides of said bicycle wheel,
   a separate brake pad mounted on each of said brake lever arms and laterally movable into frictional engagement with said bicycle wheel,
   spring biasing means acting between said bicycle frame and said lever arms to urge said brake pads laterally away from said bicycle wheel,
   a flexible cable coupled between said brake lever arms and said brake actuating mechanism to overcome said spring biasing means so as to urge said brake pads into frictional engagement with said bicycle wheel when placed in tension by said brake actuating mechanism, and
   a brake adjustment mechanism interposed between said flexible cable and said brake lever arms and including: a cable yoke having a body to which said flexible cable is anchored and a pair of supports projecting laterally from opposite sides of said body each having a laterally elongated opening therethrough, a pair of elongated rigid members which are each separately and selectively variable in length each having a first end with an internally and axially tapped socket wherein each of said sockets includes a swivel with a neck residing within the aforesaid laterally elongated opening in a separate one of said supports such that each said socket is mounted for rotation relative to a separate one of said laterally projecting supports so as to permit lateral movement therebetween, and each said elongated rigid member having a rigid rod with a proximate end that is externally threaded and threadably engaged in a separate one of said sockets and a remote end secured to a separate one of said brake lever arms by means of a hinge connection therewith.

2. A bicycle brake according to claim 1 wherein said rigid rod of each of said elongated rigid members is constructed of stainless steel.

3. A bicycle brake according to claim 1 further comprising releasable cable locking means for adjusting the longitudinal position of said flexible cable relative to said yoke body.

4. A bicycle brake according to claim 1 wherein each swivel includes a retaining barrel and each said retaining barrel is releasably coupled to a separate one of said swivel necks.

5. A bicycle brake according to claim 4 wherein each of said sockets is comprised of a tapped radial bore in said retaining barrel and a set screw threadably engaged in said tapped radial bore.

6. A bicycle brake adjustment device for use in a bicycle brake system in which tension on a flexible cable is employed to operate bicycle brake lever arms mounted separately for rotation on a bicycle frame to bring brake pads into frictional engagement with a bicycle wheel comprising: a cable coupling having a body secured to said flexible cable and a pair of supports projecting laterally from opposite sides of said body, wherein a laterally elongated opening is defined in each of said laterally projecting supports, separate internally tapped sockets carried by each of said projecting supports so as to be laterally movable relative to said supports within the limits of said elongated openings and wherein said sockets are both comprised of swivels captured by said projecting supports, said swivels having heads located on sides of said projecting supports facing away from said lever arms and internally threaded tubes directed through said laterally elongated openings towards said lever arms, and separate rigid connecting rods extending from each of said bicycle lever arms to separate ones of said sockets, each of said rods having a proximate externally threaded end threadably engaged in a separate one of said internally threaded tubes and a remote end rotatably coupled to a separate one of said brake lever arms by means of a hinge connection therewith.

7. A bicycle brake adjustment device according to claim 6 wherein said connecting rods are formed of stainless steel.

8. A bicycle brake adjustment device according to claim 6 further comprising retainers releasably secured externally on said internally threaded tubes, whereby said retainers, when secured on said internally threaded tubes, limit longitudinal movement of said sockets relative to said projecting supports.

9. A bicycle brake adjustment device according to claim 8 wherein said retainers are annular barrels which are disposed externally about said swivel tubes and are secured thereto by set screws.

10. A brake adjustment mechanism for a brake for a bicycle wheel employing a pair of brake pads mounted on lever arms which are coupled to a bicycle frame for the lateral application of force against a wheel upon actuation by tension on a flexible cable, comprising a cable yoke having a body adapted for connection to said flexible cable for movement in reciprocation therewith and having a pair of projecting supports extending from opposite sides of said body toward opposite sides of said bicycle wheel and constructed with elongated openings therein, a separate socket carried by each of said projecting supports and movable in rotation relative thereto and in translation relative thereto within the confines of said elongated openings, each socket having a tapped opening and extending through a separate one of said elongated openings and facing a separate one of said lever arms, and a pair of elongated rigid rods each secured at one end to a separate one of said lever arms and each having a proximate, externally threaded end threadably engaged in a separate ones of said tapped openings of said sockets and a remote end rotatably coupled to a separate one of said lever arms by means of a hinge connection therewith.

11. A brake adjustment mechanism according to claim 10 wherein said cable yoke includes means for releasably securing said cable yoke at a selected location along said flexible cable.

* * * * *